United States Patent
Hiyokawa

(10) Patent No.: US 8,370,061 B2
(45) Date of Patent: Feb. 5, 2013

(54) NAVIGATION DEVICE AND NAVIGATION ROAD DATA CREATING DEVICE

(75) Inventor: Toyoji Hiyokawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 408 days.

(21) Appl. No.: 12/588,881

(22) Filed: Oct. 30, 2009

(65) Prior Publication Data

US 2010/0145604 A1    Jun. 10, 2010

(30) Foreign Application Priority Data

Dec. 4, 2008   (JP) ................................. 2008-309349

(51) Int. Cl.
*G01C 21/00* (2006.01)
(52) U.S. Cl. .................... 701/461; 701/410; 340/995.18
(58) Field of Classification Search .................. 701/410, 701/414, 461, 465, 532; 340/995.18
See application file for complete search history.

(56) References Cited

U.S. PATENT DOCUMENTS

| | | | |
|---|---|---|---|
| 5,899,955 A * | 5/1999 | Yagyu et al. ................. | 701/533 |
| 6,101,443 A * | 8/2000 | Kato et al. .................... | 701/414 |
| 6,473,770 B1 * | 10/2002 | Livshutz et al. .............. | 701/414 |
| 6,507,850 B1 * | 1/2003 | Livshutz et al. .............. | 701/461 |
| 6,909,965 B1 * | 6/2005 | Beesley et al. ............... | 701/533 |
| 6,950,743 B2 | 9/2005 | Kainuma et al. | |
| 2004/0133344 A1 * | 7/2004 | Hashida et al. ............... | 701/208 |
| 2008/0091344 A1 * | 4/2008 | Mikuriya et al. ............. | 701/208 |

FOREIGN PATENT DOCUMENTS

| | | |
|---|---|---|
| JP | A-08-069247 | 3/1996 |
| JP | A-2000-329571 | 11/2000 |
| JP | A-2002-048578 | 2/2002 |
| JP | A-2002-175593 | 6/2002 |
| JP | B2-3894017 | 3/2007 |
| JP | A-2007-114128 | 5/2007 |

OTHER PUBLICATIONS

Japanese Patent Office, Notification of Reason(s) for Refusal mailed Apr. 17, 2012 in Japanese Patent Application No. 2008-309349 w/Partial English-language Translation.

* cited by examiner

*Primary Examiner* — Helal A Algahaim
(74) *Attorney, Agent, or Firm* — Oliff & Berridge, PLC

(57) ABSTRACT

A navigation device stores road data in a storage part. The road data includes a consecutive connection of a plurality of links as a link queue, the plurality of links acquired by sectioning a road length into a plurality of pieces. The navigation device includes a guidance part that performs route search and guidance to a destination using the road data. The link queue includes a standard link for which, based on a sectioned link of a specific road stored in the storage part, information relating to the sectioned link is stored as road-related information in the storage part, and an invariance link for which the road-related information is not stored in the storage part if there is no difference in the road-related information compared to an adjacent link in the link queue. A navigation road data creating device is also provided.

7 Claims, 10 Drawing Sheets

NAVIGATION DEVICE AND NAVIGATION ROAD DATA CREATING DEVICE

INCORPORATION BY REFERENCE

The disclosure of Japanese Patent Application No. 2008-309349 filed on Dec. 4, 2008, including the specification, drawings and abstract thereof, is incorporated herein by reference in its entirety.

BACKGROUND OF THE INVENTION

1. Field of the Invention

The present invention relates to navigation devices that are capable of route search from a departure point to a destination using road data and navigation road data creating devices.

2. Description of the Related Art

In conventional navigation devices installed in vehicles such as automobiles, a technology is being disclosed, in which a route where it is possible to drive smoothly and travel speed is high in an actual drive is searched based on factors that may adversely affect ease of driving and the travel speed. For example, Japanese Patent Application; Publication No. JP-A-3894017 is referenced.

In the technology of Japanese Patent Application; Publication No. JP-A-3894017, a plurality of links having the same road attribute are extracted from a consecutive and the same line (i.e., a road length), the extracted plurality of links in one and the same road are combined and grouped, it is determined whether the group of links meet a condition to be determined as a high speed road, and high speed road information is created toward the group of links determined as the high speed road.

SUMMARY OF THE INVENTION

However, according to the technology of Japanese Patent Application; Publication No. JP-A-3894017, to extract the group of links (i.e., the plurality of links), it is necessary that identification information (for example, a road type, a road attribute, and the like) for identifying a kind of road is included in each link and stored as road data. If all links include road information, data size will be increased. To absorb the increased data size, a storage medium with larger capacity can be used; however, it will cause a disadvantage of a cost increase.

In light of the problems described above, it is an object of the present invention to provide a navigation device and a navigation road data creating device that are capable of suppressing enlargement of the data size as well as easily performing route search as is conventionally done.

Means for solving the above problems are described below. To facilitate understanding, signs assigned in figures for the after-mentioned embodiments are added in brackets to the corresponding elements or items in the following description for reference.

The navigation device according to a first aspect of the present invention includes road data (12) stored in a storage part (2) and including a consecutive connection of a plurality of links (L11, L14, L15, L18, . . . , L12, L13, L16, L17, . . . ) as a link queue (21, 22, 23, . . . , 2z), the plurality of links (L11, L14, L15, L18, . . . , L12, L13, L16, L17, . . . ) acquired by sectioning a road length into a plurality of pieces, and a guidance part (3) that performs route search and guidance to a destination using the road data (12), wherein the link queue (21, 22, 23, . . . , 2z) stored in the storage part (2) is formed with a standard link (L11, L14, L15, L18, . . . ) including road-related information relating to the road data and an invariance link (L12, L13, L16, L17, . . . ) not including the road-related information if the road-related information does not change compared to an adjacent link in the link queue (21, 22, 23, . . . , 2z).

It is only necessary that the navigation device includes at least the road data (12) stored in the storage part (2) and a function that the guidance part (3) performs the route search and the guidance from a departure point to a destination using the road data (12).

The road data (12) stored in the storage part (2) is formed with the standard link (L11, L14, L15, L18, . . . ) including the road-related information relating to the road data and the invariance link (L12, L13, L16, L17, . . . ) not including the road-related information. The road-related information corresponds to all information that the guidance part (3) requires when performing the route search and the guidance from the departure point to the destination, such as information of road itself (for example, the road type, the road attribute, and the like), information having the road as a reference (for example, map information such as geography, an architectural structure, a color, and a facility along the road, and the like.) The road type (K11, K14, K15, K18, . . . ) corresponds to a national road, a prefectural road, a principal regional road, a general road, a motorway, a freeway, and the like. The road attribute (A11, A14, A15, A18, . . . ) corresponds to a main lane, a branch lane (a bypass), a motorway entrance/exit (a ramp way), a tollgate (an interchange), the number of lanes, an uphill slope, a downhill slope, and the like.

As the storage medium, any medium can be utilized as long as the medium is capable of recording at least the road data (12). For example, the medium corresponds to at least one of a semiconductor memory, a magnetic tape, a magnetic disc, a magnetic drum, a CD-ROM, a MD, a DVD-ROM, an optical disk, a MO, an IC card, an optical card, a memory card, and the like.

The link queue (21, 22, 23, . . . , 2z) is structured with a plurality of links (31, 32, 33, . . . , 3x, 41, 42, . . . , 4y). The link queue is created for each road (i.e., a consecutive and the same line) by sectioning the length of a road into a plurality of pieces.

The navigation device according to a second aspect of the present invention further comprises an information acquisition unit (3c) that, when performing the route search and the guidance to the destination using the road data (12) stored in the storage part (2), if the specified link is the invariance link (L12, L13, L16, L17, . . . ), searches for the standard link (L11, L14, L15, L18, . . . ) in the link queue (21, 22, 23, . . . , 2z) and acquires the road-related information of the searched standard link (L11, L14, L15, L18, . . . ).

That is, the information acquisition unit (3c), when the invariance link (L12, L13, L16, L17, . . . ) has been specified, searches for the link including the road-related information and acquires the road-related information by repeating a procedure of referring to the most neighboring link and trying to acquire the road-related information.

The link queue (21, 22, 23, . . . , 2z) stored in the storage part (2) of the navigation device according to a third aspect of the present invention includes for the standard link (L11, L14, L15, L18, . . . ) a change attribute indicating that the road-related information changes (C11, C14, C15, C18, . . . ) and includes for the invariance link (L12, L13, L16, L17, . . . ) a change attribute indicating that the road-related information does not change (C12, C13, C16, C17, . . . ), and the information acquisition unit (3c) determines the standard link (L11, L14, L15, L18, . . . ) by referring to the change attribute (C11, C12, C13, C14, C15, C16, C17, C18, . . . ) of the specified link and acquires the road-related information of the determined standard link (L11, L14, L15, L18, . . . ).

That is, the information acquisition unit (3c) determines the existence of the change by referring to the change attribute of the specified link, and if the invariance link has been specified, determines the standard link including the change and acquires the road-related information by repeating the procedure of referring to the change attribute of the most neighboring link.

The link queue (21, 22, 23, . . . , 2z) stored in the storage part (2) of the navigation device according to a fourth aspect of the present invention is formed with the standard link (L11, L14, L15, L18, . . . ) including the road related-information and the invariance link (L12, L13, L16, L17, . . . ) including the identification information (P12, P13, P16, P17, . . . ) that identifies the standard link (L11, L14, L15, L18, . . . ), and the information acquisition unit (3c), if the standard link (L11, L14, L15, L18, . . . ) has been specified, acquires the road-related information of the standard link (L11, L14, L15, L18, . . . ), and if the invariance link (L12, L13, L16, L17, . . . ) has been specified, acquires the road-related information of the standard link (L11, L14, L15, L18, . . . ) based on the identification information (P12, P13, P16, P17, . . . ).

That is, the information acquisition unit (3c), when the standard link (L11, L14, L15, L18, . . . ) has been specified, directly acquires the road-related information, and when the invariance link has been specified, determines the standard link (L11, L14, L15, L18, . . . ) based on the identification information and acquires the road-related information.

The link queue (21, 22, 23, . . . , 2z) stored in the storage part (2) of the navigation device according to a fifth aspect of the present invention is formed with a link attribute (R11, R14, . . . ) that provides a range of links having the same road-related information and the road-related information to be associated with the link attribute (R11, R14, . . . ), and the information acquisition unit (3c) determines the link attribute (R11, R14, . . . ) including the specified link in the range and acquires the road-related information associated with the link attribute (R11, R14, . . . ).

That is, the information acquisition unit (3c) determines the link attribute (R11, R14, . . . ) including the specified link in the range and acquires the road-related information related to the determined link attribute (R11, R14, . . . ).

A navigation road data creating device according to a sixth aspect of the present invention, in the navigation device including the storage part (2) storing the road data (12) structured with the link queues (21, 22, 23, . . . , 2z) having a plurality of links acquired by sectioning a consecutive and the same road and the guidance part (3) that performs the route search and the guidance from the departure point to the destination using the road data (12), includes: a link queue formation unit (3d) that extracts the plurality of links as the link queue (21, 22, 23, . . . , 2z); a change determination unit (3e) that determines for each of the links forming the extracted link queue (21, 22, 23, . . . , 2z) whether or not the road-related information relating to the road data changes compared to the adjacent link; an information storage unit (3f) that stores in the storage part (2) the road-related information for the standard link (L11, L14, L15, L18, . . . ) determined by the change determination unit (3e) as the road-related information changes, and does not store the road-related information for the invariance link (L12, L13, L16, L17, . . . ) determined by the change determination unit (3e) as the road-related information does not change.

The link queue formation unit (3d) extracts a plurality of links acquired by sectioning a road (a consecutive and the same line) as the link queue.

The change determination unit (3e) determines for the links forming the extracted link queue whether or not the road-related information changes compared to the adjacent link.

The information storage unit (30 stores the road-related information for the standard link (L11, L14, L15, L18, . . . ) determined as the road-related information changes, and does not store the road-related information for the invariance link (L12, L13, L16, L17, . . . ) determined as the road-related information does not change.

The information storage unit (30 of the navigation road data creating device according to a seventh aspect of the present invention, for each of the links forming the link queue (21, 22, 23, . . . , 2z), if the road-related information changes compared to the adjacent link in the link queue (21, 22, 23, . . . , 2z), stores in the storage part (2) a change attribute indicating that the road-related information changes (C11, C14, C15, C18, . . . ), and if the road-related information does not change compared to the adjacent link in the link queue, stores a change attribute indicating that the road-related information does not change (C12, C13, C16, C17, . . . ).

That is, the information storage unit (31) stores in the storage part (2) the change attribute indicating that the road-related information changes for the standard link (L11, L14, L15, L18, . . . ) and the change attribute indicating that the road-related information does not change for the invariance link (L12, L13, L16, L17, . . . ).

The information storage unit (3f) of the navigation road data creating device according to an eighth aspect of the present invention stores in the storage part (2) the road-related information for a link of which the road-related information changes compared to the adjacent link in the link queue (21, 22, 23, . . . , 2z) as being the standard link (L11, L14, L15, L18, . . . ), and stores the identification information (P12, P13, P16, P17, . . . ) that identifies the standard link (L11, L14, L15, L18, . . . ) having the same road-related information for a link of which the road-related information does not change compared to the adjacent link in the link queue (21, 22, 23, . . . , 2z) as being the invariance link (L12, L13, L16, L17, . . . ).

That is, the information storage unit (3f) stores in the storage part (2) the road-related information for the standard link (L11, L14, L15, L18, . . . ) and the identification information for the invariance link (L12, L13, L16, L17, . . . ).

EFFECTS OF THE INVENTION

According to the first aspect of the present invention, the link queue (21, 22, 23, . . . , 2z) stored in the storage part (2) includes the road-related information only for the standard link (L11, L14, L15, L18, . . . ) and does not include the road-related information for the invariance link (L12, L13, L16, L17, . . . ). It is not required that all the links constituting the link queue include the road-related information as is conventionally done; therefore, it is possible not only to suppress enlargement of data size but also reduce the data size. If the data can be stored in a low-capacity storage medium by the reduction of the data size, a cost of a whole device can be reduced. In addition, it will cause little processing speed decrease because there is a small amount of information to be read because of the invariance link (L12, L13, L16, L17, . . . ).

According to the second aspect of the present invention, when performing the route search and the guidance from the departure point to the destination, even if the invariance link (L12, L13, L16, L17, . . . ) not having the road-related information has been specified, the information acquisition unit (3c) searches for the standard link (L11, L14, L15, L18, . . . )

having the road-related information in the link queue (21, 22, 23, ..., 2z) and acquires the road-related-information. Therefore, in addition to the effect indicated in the first aspect of the present invention, it is possible to surely acquire the road-related information as is conventionally done. Even when the memory amount of the storage part (2) is reduced, the route search can be performed with a quick response as is conventionally done.

According to the third aspect of the present invention, the link (L11, L12, L13, L14, L15, L16, L17, L18, ...) forming the link queue (21, 22, 23, ..., 2z) includes for the standard link (L11, L14, L15, L18, ...) the change attribute as "with change" (C11, C14, C15, C18, ...) and for the invariance link (L12, L13, L16, L17, ...) the change attribute as "no change" (C12, C13, C16, C17, ...). The information acquisition unit (3c), if the standard link has been specified, is able to immediately acquire the road-related information, and even if the invariance link (L12, L13, L16, L17, ...) has been specified, is able to determine the standard link (L11, L14, L15, L18, ...) and acquire the road-related information by referring to the change attribute and tracing the links in the link queue (21, 22, 23, ..., 2z). Therefore, in addition to the effect indicated in the second aspect of the present invention, it is possible to surely acquire the road-related information of the standard link (L11, L14, L15, L18, ...) and perform the route search as is conventionally done.

According to the fourth aspect of the present invention, the link (L11, L12, L13, L14, L15, L16, L17, L18, ...) forming the link queue (21, 22, 23, ..., 2z) is formed with the standard link (L11, L14, L15, L18, ...) including the road-related information and the invariance link (L12, L13, L16, L17, ...) including the identification information (P12, P13, P16, P17, ...) that identifies the standard link (L11, L14, L15, L18, ...). The information acquisition unit (3c), if the standard link (L11, L14, L15, L18, ...) has been specified, is able to immediately acquire the road-related information, and even if the invariance link (L12, L13, L16, L17, ...) has been specified, is able to determine the standard link (L11, L14, L15, L18, ...) based on the identification information and acquire the road-related information. Therefore, in addition to the effect indicated in the second aspect of the present invention, it is possible to acquire the road information including the road-related information in a short time whichever link is specified.

According to the fifth aspect of the present invention, the link (L11, L12, L13, L14, L15, L16, L17, L18, ...) forming the link queue (21, 22, 23, ..., 2z) is formed with the link attribute (R11, R14, ...) that provides a range of links having the same road-related information and the road-related information to be associated with the link attribute (R11, R14, ...). The information acquisition unit (3c) is able to determine the link attribute (R11, R14, ...) including the specified link in the range and acquire the road-related information associated with the link attribute (R11, R14, ...). Therefore, in addition to the effect indicated in the second aspect of the present invention, the change attribute and the identification information become unnecessary. As a result, it is possible to reduce the data size.

According to the sixth aspect of the present invention, for the link queue (21, 22, 23, ..., 2z) extracted by the link queue formation unit (3d), the change determination unit (3e) determines for each of the links forming the link queue (21, 22, 23, ..., 2z) whether or not the road-related information changes compared to the adjacent link. The information storage unit (3f), if it is determined that the road-related information changes, stores in the storage part (2) the road-related information for the standard link (L11, L14, L15, L18, ...), and if it is determined that the road-related information does not change, does not store the road-related information for the invariance link (L12, L13, L16, L17, ...). Therefore, it is possible to automatically create the road data (12) to be stored in the storage part (2) indicated in the first aspect of the present invention.

According to the seventh aspect of the present invention, the information storage unit (30, if the road-related information changes, stores in the storage part (2) the change attribute indicating that the road-related information changes (C11, C14, C15, C18, ...), and if the road-related information does not change, stores the change attribute indicating that the road-related information does not change (C12, C13, C16, C17, ...). Therefore, in addition to the effect indicated in the sixth aspect of the present invention, it is possible to automatically create the road data (12) to be stored in the storage part (2) indicated in the third aspect of the present invention.

According to the eighth aspect of the present invention, the information storage unit (30 stores in the storage part (2) the road-related information for a link of which the road-related information changes as being the standard link (L11, L14, L15, L18, ...), and stores the identification information (P12, P13, P16, P17, ...) that identifies the standard link (L11, L14, L15, L18, ...) having the same road-related information for a link of which the road-related information does not change as being the invariance link (L12, L13, L16, L17, ...). Therefore, it is possible to automatically create the road data (12) to be stored in the storage part (2) indicated in the fourth aspect of the present invention.

DETAILED DESCRIPTION OF THE PREFERRED EMBODIMENT

Figure 1:
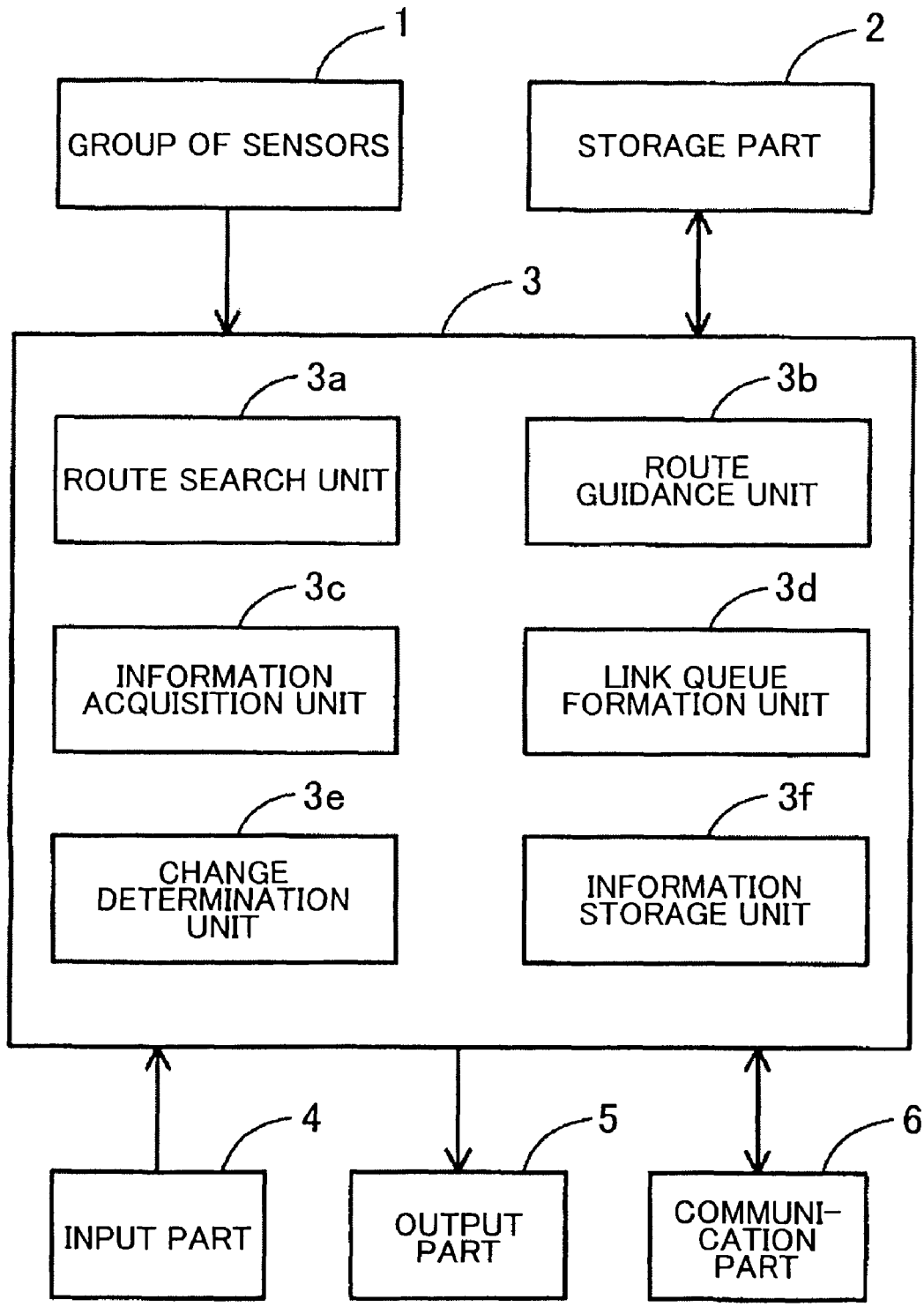
FIG. 1 is a schematic view showing a structure example of a navigation device according to a first embodiment of the present invention.

The present invention is described in further detail below with reference to embodiments in conjunction with the accompanying drawings. In the embodiments, the same symbols and signs in the drawings refer to the same or corresponding function parts; therefore, overlapped explanation is omitted.

[First Embodiment]

Figure 2:
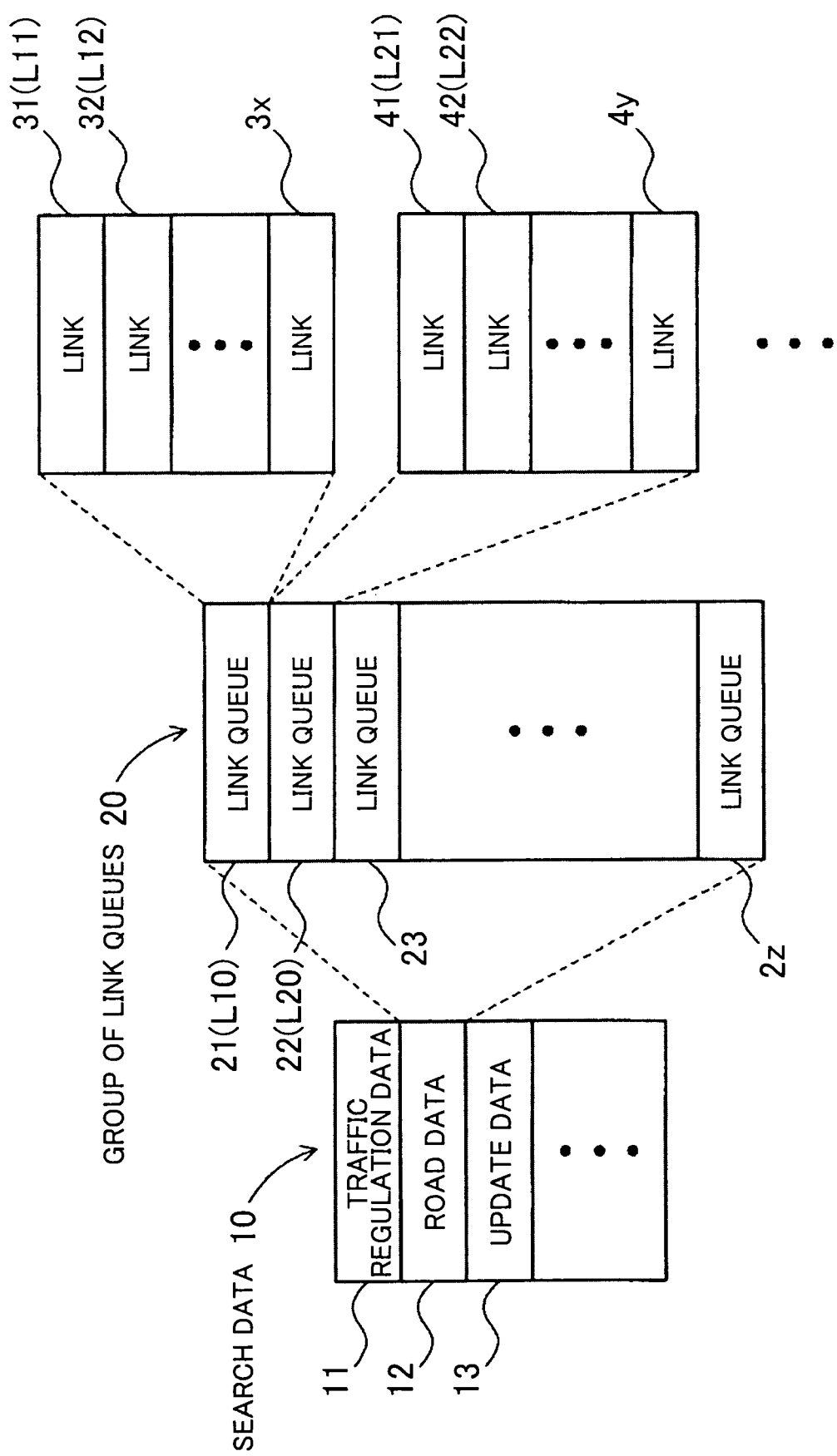
FIG. 2 is a schematic view showing a structure example of search data in the navigation device according to the first embodiment of the present invention.
Figure 3:
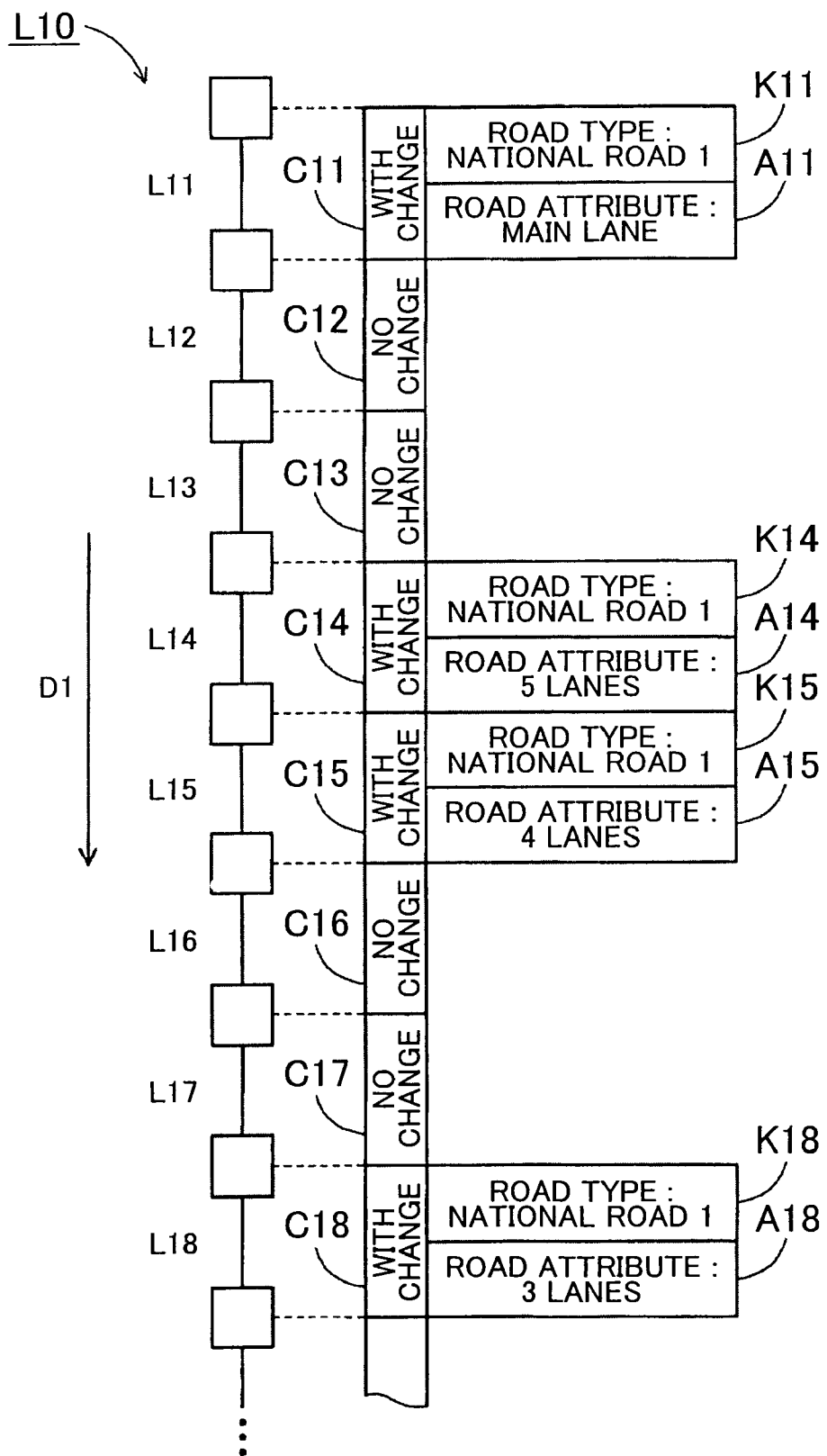
FIG. 3 is a schematic view showing a structure example of a link queue in the navigation device according to the first embodiment of the present invention.
Figure 4:
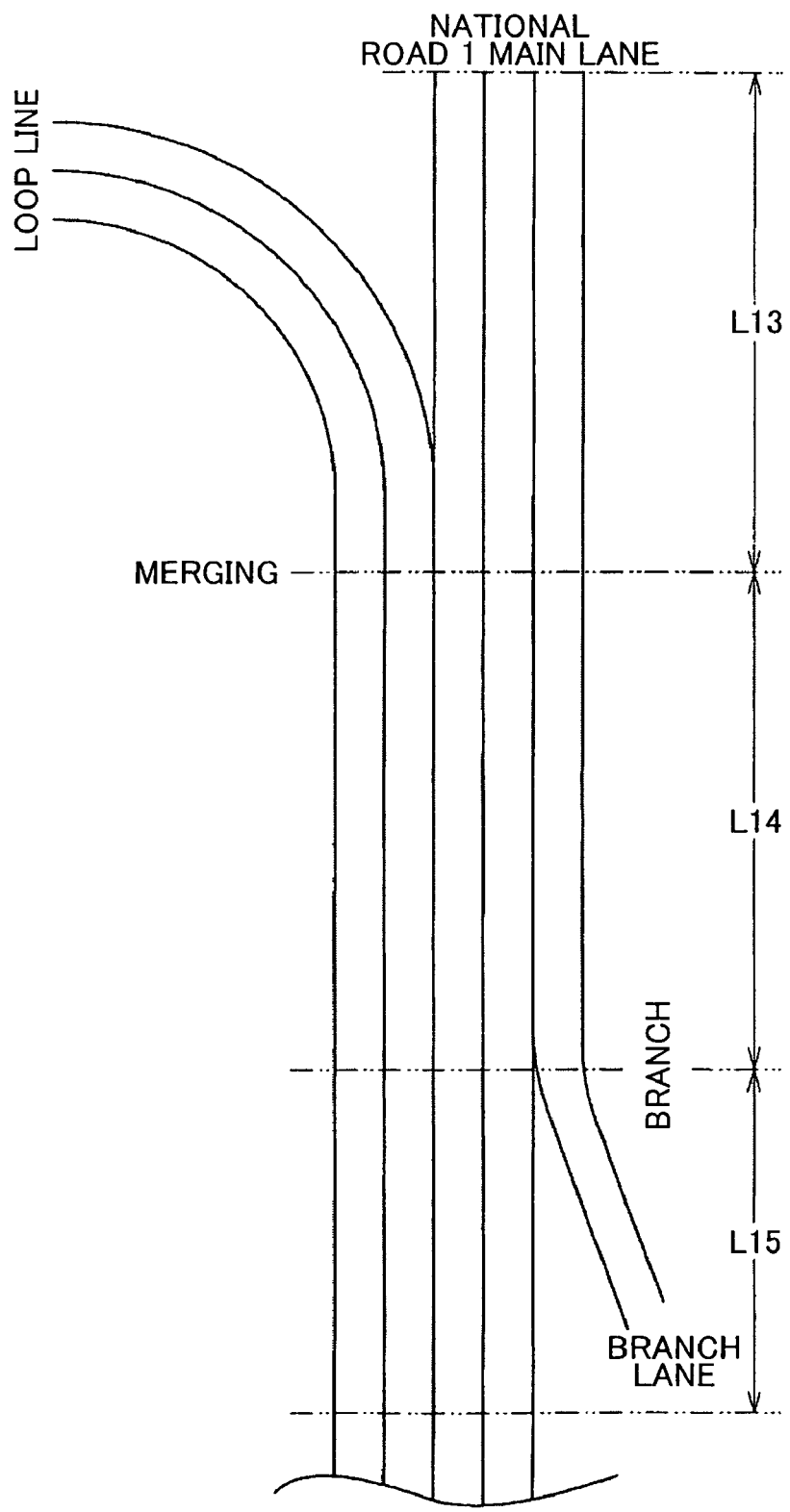
FIG. 4 is a schematic view showing an example of a map indicating the number of lanes in a part of the link queue in the navigation device according to the first embodiment of the present invention.
Figure 5:
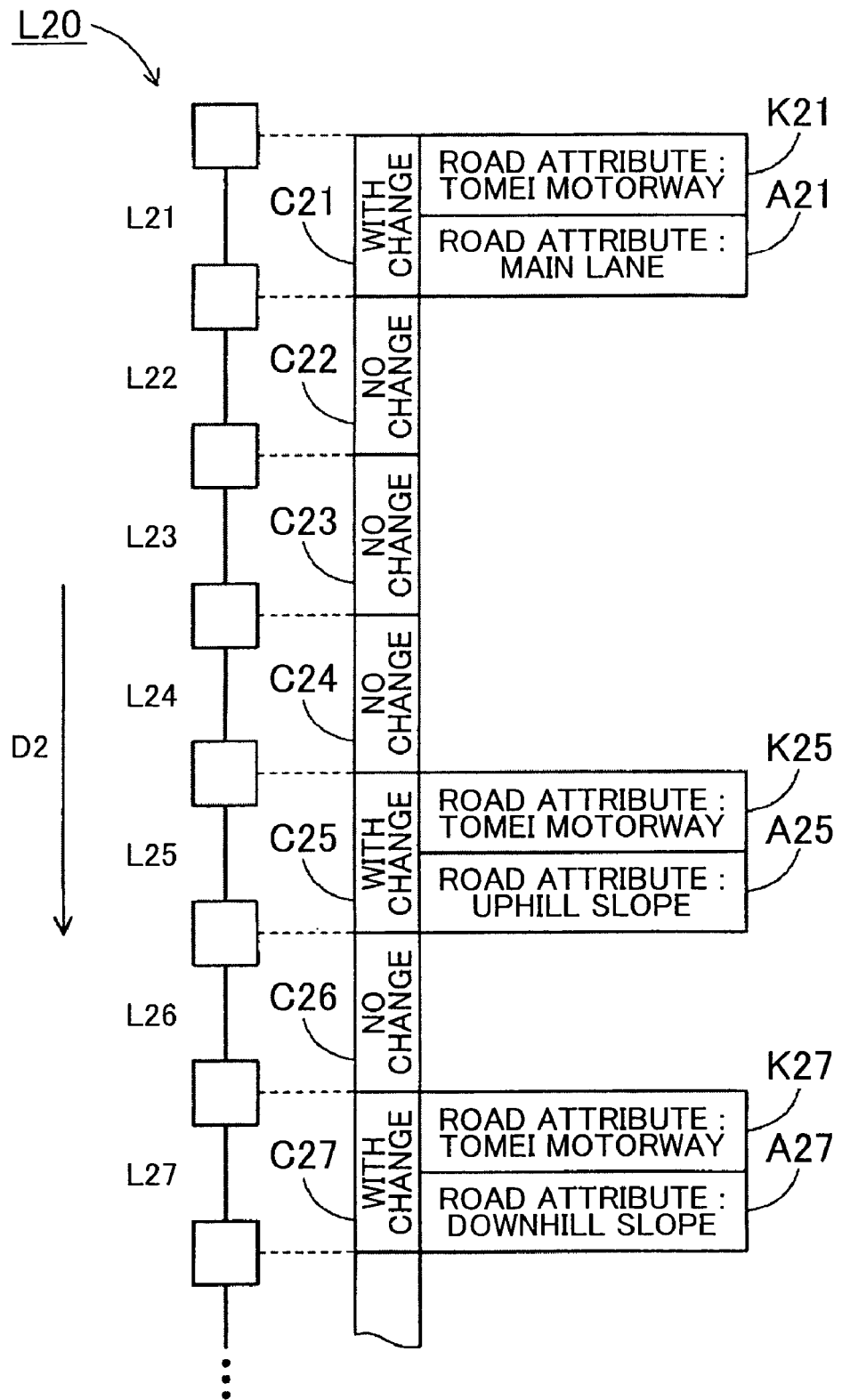
FIG. 5 is a schematic view showing a structure example of the link queue in the navigation device according to the first embodiment of the present invention.
Figure 6:
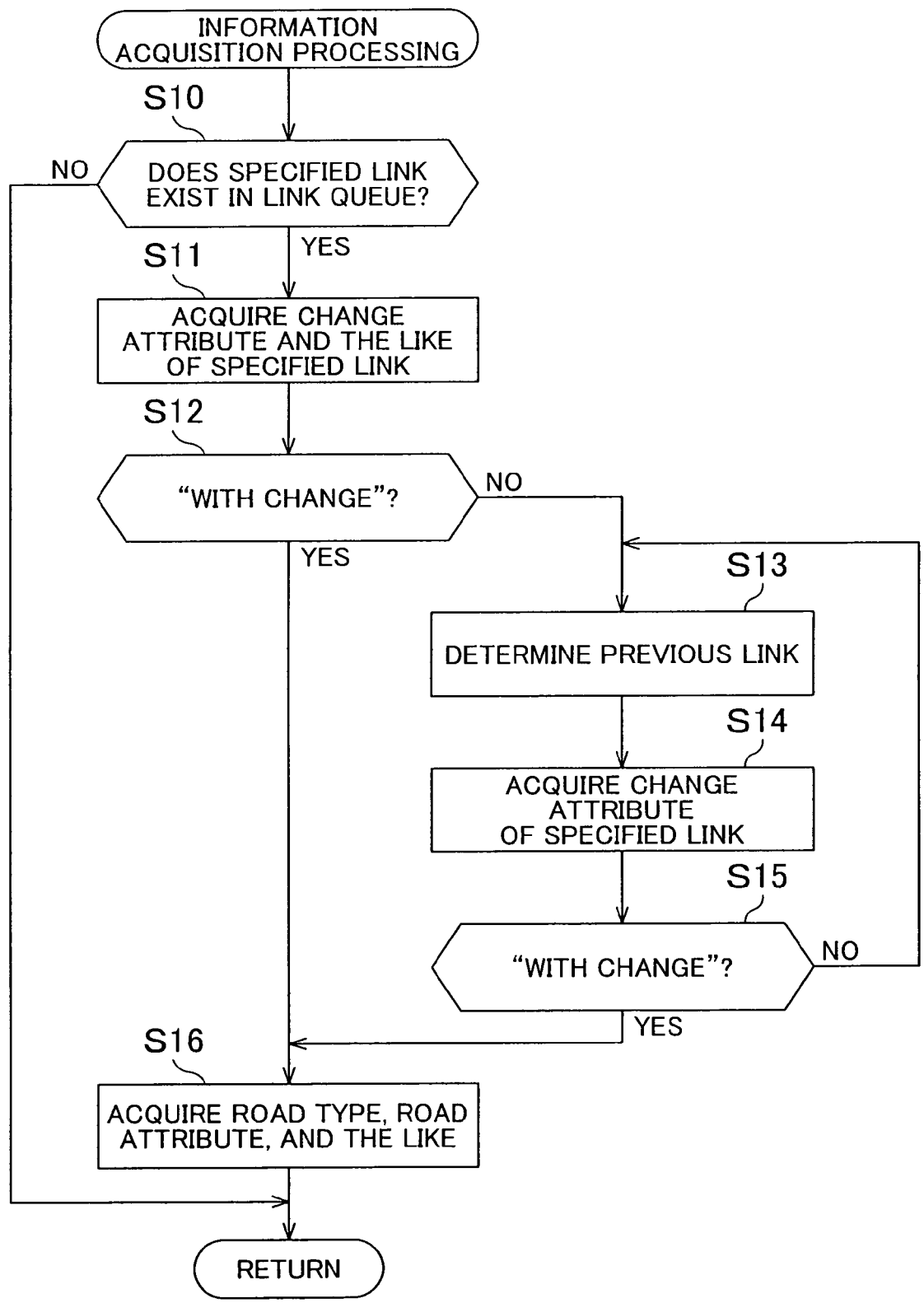
FIG. 6 is a flowchart showing a procedure example of information acquisition processing in the navigation device according to the first embodiment of the present invention.

A first embodiment is an example in which a change attribute is included in each of links constituting a link queue and stored, which is described with reference to the navigation device according to the embodiment of the present invention with FIGS. 1 to 6. FIG. 1 is a schematic view showing a structure example of the navigation device according to the first embodiment of the present invention. FIG. 2 is a schematic view showing a structure example of search data in the navigation device according to the first embodiment of the present invention. FIG. 3 is a schematic view showing a structure example of a link queue in the navigation device according to the first embodiment of the present invention. FIG. 4 is a schematic view showing an example of a map indicating the number of lines in a part of the link queue in the navigation device according to the first embodiment of the present invention. FIG. 5 is a schematic view showing a structure example of the link queue in the navigation device according to the first embodiment of the present invention. FIG. 6 is a flowchart showing a procedure example of information acquisition processing in the navigation device according to the first embodiment of the present invention.

First, the navigation device indicated in FIG. 1 includes a group of sensors 1, a storage part 2, a guidance part 3, an input part 4, an output part 5, a communication part 6, and the like. The group of sensors 1 includes at least one sensor necessary for route search, route guidance, and the like among, for example, a GPS (Global Positioning System) sensor, a geomagnetic sensor, a distance sensor, a steering sensor, a beacon sensor, a gyro sensor, an altitude sensor, and the like. As the storage part 2, a storage medium capable of recording (storing) at least after-mentioned map data 12 is utilized. Such storage medium corresponds to at least one of, for example, a semiconductor memory, a magnetic tape, a magnetic disc, a magnetic drum, a CD-ROM, a MD, a DVD-ROM, an optical disk, a MO, an IC card, an optical card, a memory card, and the like.

Here, the storage part 2 stores an after-mentioned link queue. However, the link queue, a standard link storing road-related information, and an invariance link not storing the road-related information can be stored in different storage media. That is, it is only necessary to maintain a certain relation between the link queue and the road-related information. In the structure example indicated in FIG. 1, the storage part 2 is provided separately from the guidance part 3. However, the storage part 2 may be provided within the guidance part 3.

The guidance part 3 can realize a function that performs the route search and the guidance from a departure point to a destination using after-mentioned search data 10 (refer to FIG. 2). Specifically, in addition to a route search unit 3a that realizes the route search and a route guidance unit 3b that realizes the route search and the route guidance, to realize the present invention, the guidance part 3 includes an information acquisition unit 3c, a link queue formation unit 3d, a change determination unit 3e, an information storage unit 3f, and the like. The respective units are realized separately by execution of software or according to functions of hardware. The processing of the route search unit 3a and the route guidance unit 3b is not described in detail because of its generality. In short, the route search unit 3a is a function that searches for a route when a destination has been set. The route guidance unit 3b is a function that provides guidance for the destination while driving on road.

When performing the route search and the guidance from the departure point to the destination using the search data 10 (especially, road data 12) stored in the storage part 2, if a link constituting a link queue does not include the road-related information, the information acquisition unit 3c searches for a standard link having the road-related information in the link queue to acquire the road-related information. Specifically, the information acquisition unit 3c traces links sequentially referring to the change attribute, determines the standard link, and acquires the road-related information included in the determined standard link.

The road-related information corresponds to all information that the guidance part 3 requires when performing the route search and the guidance from the departure point to the destination, such as information of road itself, information having the road as a reference, and the like. Naturally, map data is one of the road-related information.

The information of road itself corresponds to at least one of, for example, a road type, a road attribute, position information of both ends (the departure point, the destination, and the like), a road width, an inclination, a cant, an altitude, a bank, a road surface condition, an existence of a center divider, the number of lanes of a road, the number of lanes increasing or decreasing point, a road width broadening or narrowing point, and the like. In the case of a motorway or a main road, lanes in opposite directions are preferable to be stored separately as different road data 12 (i.e, two-way road). For example, in the case of a road having 2 or more lanes, the lane in an upward direction and the lane in a downward direction are treated as separate roads, and the road data 12 is stored for each lane. For a curve and a corner, it is preferable to include a curvature radius, an intersection, an entrance and an exit of the curve and the corner, and the like. The road type corresponds to a national road, a prefectural road, a principal regional road, a general road, a motorway, a freeway, and the like. The road attribute corresponds to a main lane, a branch lane (a bypass), a motorway entrance/exit (a ramp way), a tollgate (an interchange), the number of lanes, an uphill slope, a downhill slope, and the like.

The information having the road as a reference corresponds to at least one of, for example, geography (including color-coded information and the like), an architectural structure (including a play facility, a name of a building, a name of a store, and the like), information of a resort and a scenic spot, a parking facility along the road, and the like.

The link queue formation unit 3d extracts two or more links over a consecutive and the same line among a plurality of links as the link queue.

The change determination unit 3e determines for each of the links constituting the link queue extracted by the link queue formation unit 3d or an existing link queue whether or not the road-related information changes compared to an adjacent link. In principle, the "adjacent link" means a neighbor link connected to a specified link. However, if the neighbor link does not include the road-related information, the "adjacent link" means a certain nearest link having the road-related information (i.e., the standard link), which is determined by tracing further links.

The information storage unit 3f stores in the storage part 2 the road-related information if it is determined by the change determination unit 3e that the road-related information changes, and does not store the road-related information if it is determined by the change determination unit 3e that the road-related information does not change.

The input part 4 is a part where an operator modifies a position at a driving start and inputs the departure point, the destination, and the like. For example, the input part 4 corresponds to an operation key, a push button, a jog dial, an arrow key, a touch panel, and the like, which are installed in a main unit of an in-vehicle device. In addition, the input part 4 may be an audio input device structured with a remote controller, a microphone, and the like.

The output part 5 is a part where an announcement of the result of the route search and the route guidance are performed. For example, the output part 5 corresponds to at least one of an indicator (specifically, a LCD, an EL, a plasma, a CRT, and the like), a speaker, a vibrator, and the like. In addition, if an audio synthesizer is provided, the output part 5 may be an audio output device capable of outputting an audio synthesized by the audio synthesizer.

The communication part 6 transmits and receives various kinds of data with a FM transmitting device, a telephone line, an Internet, a cellular phone network, and the like. For example, the communication part 6 receives various kinds of data such as road information of congestion, traffic accident information, which have been received with a predetermined sensor, and D-GPS information that detects a detection error of a GPS sensor, and the like. In addition, a program for realizing functions of the present invention and a program, data, or the like for operating the whole navigation device are transmitted and received from an information center (for example, an Internet server, a navigation server, and the like) to a plurality of base stations (a provider terminal of internet, a communication station connected via a telecommunication line/a communication line, and the like).

Here, a structure example of the search data 10 (i.e., a data structure) stored in the storage part 2, which is utilized when the guidance part 3 performs the route search and the guidance from the departure point to the destination, is explained with reference to FIG. 2.

The search data 10 includes traffic regulation data 11, road data 12, update data 13, other data, and the like. Hereinafter, each of the data is explained.

The traffic regulation data 11 includes information relating to a road where a traffic regulation is being enforced due to influence of a construction, an accident, a disaster, and the like. Specifically, the traffic regulation data 11 corresponds to data that identifies the road or the section where the traffic regulation is being enforced, data that identifies the particularities of the traffic regulation (for example, closed to traffic, lane closure, road narrowing, and the like), and the like. The traffic regulation data 11 is acquired mainly through the communication part 6 or the like, and stored in a rewritable storage medium (for example, a RAM).

If all or a part of the road data 12 is stored in a not-rewritable storage medium (for example, a CD-ROM, a DVD-ROM, or the like), the update data 13 includes data on which the recorded content of the road data 12 has changed. The update data 13 is acquired through a separate storage medium, the communication part 6, or the like, and stored in the rewritable storage medium (for example, the RAM).

The road data 12 includes the registered number of roads, a group of link queues 20 indicating a road (particularly, a road length of a consecutive and the same line), and a number for identifying own or another roads, and the like. The group of link queues 20 includes at least one of link queues 21, 22, 23, . . . , 2z. The group of link queues 20 may be formed only with the link queues. Or, in the case of a road in which the road-related information does not change from the start point to the end point, the links may be included in the group.

Each link queue includes a plurality of links that are acquired by sectioning a consecutive and the same line under a predetermined condition (for example, an intersection, an administrative area, and the like). In the present embodiment, a link queue 21 includes links 31, 32, 33, . . . , 3x, and a link queue 22 includes links 41, 42, . . . , 4y. The number of links constituting each link queue varies and generally is not the same. A concrete structure example of the link queue is explained later (refer to FIGS. 3 and 4).

The structure example of the link queue (the data structure) is explained with reference to FIGS. 3 and 4.

In order to make an explanation simple, the road-related information applies the road types K11, K14, K15, and K18 and the road attributes A11, A14, A15, and A18 in FIG. 3. Links L13, L14, and L15 in FIG. 3 correspond to a map showing the number of lanes of the links L13, L14, and L15 in the map of FIG. 4. In FIG. 5, an example, where road types K21, K25, and K27 and road attributes A21, A25, and A27 are applied, is explained. In addition, for various information contents such as "national road 1 (national road)", "main lane", "uphill slope", "downhill slope", "with change", "no change", and the like, any data format can be applied as long as the contents are determined. For example, it can be a letter, a letter string, a numerical value, a symbol, a flag, or the like.

A link queue L10 indicated in FIG. 3 is structured with a plurality of links L11, L12, L13, L14, L15, L16, L17, L18, . . . . It is assumed that a travel direction of a vehicle is the downward direction in relation to the drawing, that is, the direction of an arrow D1. The link queue L10 corresponds to an example of the link queue 21 indicated in FIG. 2. The links L11, L12, L13, L14, L15, L16, L17, L18, . . . corresponds to an example of the links 31, 32, 33, . . . , 3x indicated in FIG. 2.

In a range of the link queue L10 indicated in FIG. 3, the road attribute changes at each of the links L11, L14, L15, L18 with respect to the travel direction. Therefore, all of the change attributes C11, C14, C15, C18 have information content as "with change". Hence, all of the links L11, L14, L15, L18 correspond to the standard link.

On the other hand, neither the road type nor the road attribute changes at the links L12, L13, L16, L17 with respect to the travel direction. Therefore, all of the change attributes C12, C13, C16, C17 have the information content as "no change". Hence, all of the links L12, L13, L16, L17 correspond to the invariance link.

The link L11 includes the road type K11 and the road attribute A11 because the change attribute C11 is "with change". In the same manner, the links L14, L15, and L18 include the road types K14, K15, and K18 and the road attributes A14, A15, and A18. All of the road types K11, K14, K15, and K18 have the information content as "national road 1", which is one of the national roads. The road attribute A11 has the information content as "main lane" indicating the main lane, and the link L11 is a link of a start of the national road 1. The road attribute A14 has the information content as "5 lanes" indicating that the lane in a vehicle's travel direction becomes 5 lanes by 2 lanes of a loop line merging with 3 lanes of the national road 1. In addition, the road attribute A15 has the information content as "4 lanes" indicating that the lane in the vehicle's travel direction becomes 4 lanes by branching from 5 lanes. The road attribute A18 has the information content as "3 lanes" indicating that the lane in the vehicle's travel direction becomes 3 lanes because of decrease in traffic. In the example of FIG. 3, the road attribute changes whereas the road type is the same. However, it is possible, for example, to store such that links in which one or both of the road type and the road attribute changes include the road type and the road attribute together with the change attribute and links in which neither the road type nor the road attribute changes include the change attribute only.

A link queue L20 indicated in FIG. 5 is structured with a plurality of links L21, L22, L23, L24, L25, L26, L27, .... It is assumed that the travel direction of the vehicle is the downward direction in relation to the drawing, that is, the direction of an arrow D2. The link queue L20 corresponds to an example of the link queue 22 indicated in FIG. 2. The links L21, L22, L23, L24, L25, L26, L27, ... corresponds to an example of the links 41, 42, ..., 4y indicated in FIG. 2.

In a range of the link queue L20 indicated in FIG. 5, the road attribute changes at each of the links L21, L25, L27 with respect to the travel direction. Therefore, all of the change attributes C21, C25, C27 have information content as "with change". Hence, all of the links L21, L25, L27 correspond to the standard link.

On the other hand, neither the road type nor the road attribute change at the links L22, L23, L24, L26 with respect to the travel direction. Therefore, all of the change attributes C22, C23, C24, C26 have the information content as "no change". Hence, all of the links L22, L23, L24, L26 correspond to the invariance link.

The link L21 can be, for example, a starting point of "Tomei motorway", and the change attribute C21 is "with change". Therefore, the link L21 includes the road type K21 and the road attribute A21. In the same manner, the links L25 and L27 include the road types K25 and K27 and the road attributes A25 and A27 respectively. All of the road types K21, K25, K27 have the information content as "Tomei motorway", which is one of the motorways. The road attribute A21 has the information content as "main lane" indicating the main lane. The road attribute A25 has the information content as "uphill slope" indicating the uphill slope. The road attribute A27 has the information content as "downhill slope" indicating the downhill slope. The presence or absence of the change in the road type and the road attribute is defined in the same manner as the example indicated in FIG. 3.

An example of the processing for acquiring the road information including at least one of the road type and the road attribute in the navigation device structured as above is explained with reference to FIG. 6.

The information acquisition processing of FIG. 6 corresponds to the information acquisition unit 3c indicated in FIG. 1, which is executed when referring to the road data 12 (specifically, any of the link queues 21, 22, 23, ..., 2z indicated in FIG. 2) for performing the route search and the guidance from the departure point to the destination.

First, it is determined whether a specified link of which the road information is intended to be acquired exists in the link queue [Step S10]. For example, if it is assumed that the link queue L10 indicated in FIG. 3 corresponds to the range from the link L11 to a link L1x (not shown), it is determined whether the link has been specified in this range. If the specified link does not exist in the link queue (NO), the information acquisition processing is terminated and returned because the link to be acquired does not exist.

If the specified link exists in the link queue (Step S10: YES), the position information, the change attribute, and the like are acquired for the specified link [Step S11], and it is determined whether or not the information content of the change attribute is "with change" [Step S12]. If the information content of the change attribute is "with change" (YES), the specified link includes the road type and the road attribute. Therefore, the relevant road type and road attribute are acquired [Step S16]. Then, the information acquisition processing is terminated and returned. Thus, by executing Steps S11 and S16, the road information of the specified link can be acquired.

If the information content of the change attribute is "no change" [Step S12: NO], the link just before the current link is specified [Step S13]. For example, in the case of the link queue L10 indicated in FIG. 3, if the current link is the link L13, the link L12 is specified, and if the current link is the link L12, the link L11 is specified. The change attribute of the specified link is acquired [Step S14], and it is determined whether or not the information content of the change attribute is "with change" as Step S12 [Step S15]. If the information content of the change attribute is "with change" (YES), the road type and the road attribute are acquired [Step S16]. Then, the information acquisition processing is terminated and returned. On the other hand, if the information content of the change attribute is "no change" (Step S15: NO), the above-mentioned Steps S13 to S15 are repeated.

[Second Embodiment]

A second embodiment is an example of the invariance link including identification information and explained with reference to FIGS. 7 and 8.

Figure 7:
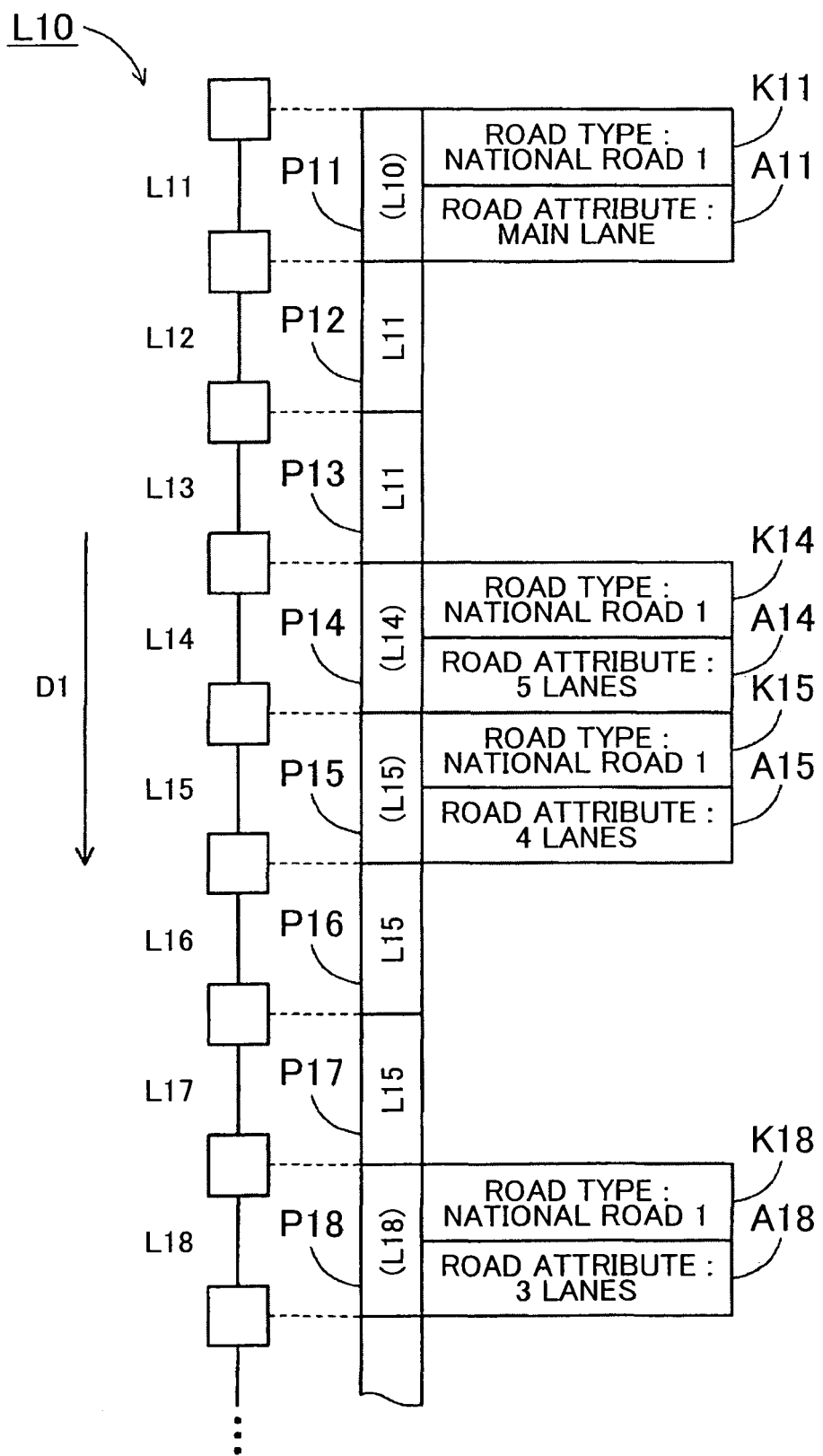
FIG. 7 is a schematic view showing the structure example of the link queue in the navigation device according to a second embodiment of the present invention.

FIG. 7 is a schematic view showing the structure example of the link queue in the navigation device according to the second embodiment of the present invention. FIG. 8 is a flowchart showing a procedure example of the information acquisition processing in the navigation device according to the second embodiment of the present invention. The structure and the like of the navigation device is the same as the first embodiment. In order to make the illustration and explanation simple, portions different from the first embodiment is explained in the second embodiment. Thus, the same signs are assigned to the elements that are the same as the elements used in the first embodiment, and the explanation is omitted.

The structure example of the link queue L10 indicated in FIG. 7 is an alternative to the structure example of the link queue L10 indicated in FIG. 3. Specifically, the link queue L10 includes the identification information P11, P12, P13, P14, P15, P16, P17, P18, ... in FIG. 7 instead of the change attribute C11, C12, C13, C14, C15, C16, C17, C18, ... in FIG. 3. The identification information is information (for example, an address, a pointer, or the like) to identify the link where the road-related information (one or both of the road type and the road attribute, in this example) changes.

Each of the links L11, L14, L15, and L18, where the road-related information changes, includes the road type and the road attribute and corresponds to the "standard link". The other links L12, L13, L16, L17, ... includes the identification information P12, P13, P16, P17, ... that identify one of the links L11, L14, L15, and L18, and corresponds to the "invariance link".

According to the example of FIG. 7, the identification information P12 and P13 included in the links L12 and L13 identify the link L11, and the identification information P16 and P17 included in the links L16 and L17 identify the link L15. In addition, the links L11, L14, L15, and L18 may include the identification information P11, P14, P15, and P18 (which are indicated in brackets in FIG. 7) identifying the own links, or may not include the identification information itself to reduce data volume.

An example of the processing to acquire the road type and the road attribute as the road-related information in the navigation device storing in the storage part 2 the search data 10 structured with the link queue L10 exemplified in FIG. 7 is explained with reference to FIG. 8. The information acquisition processing in FIG. 8 is an alternative to the information acquisition processing indicated in FIG. 6.

Figure 8:
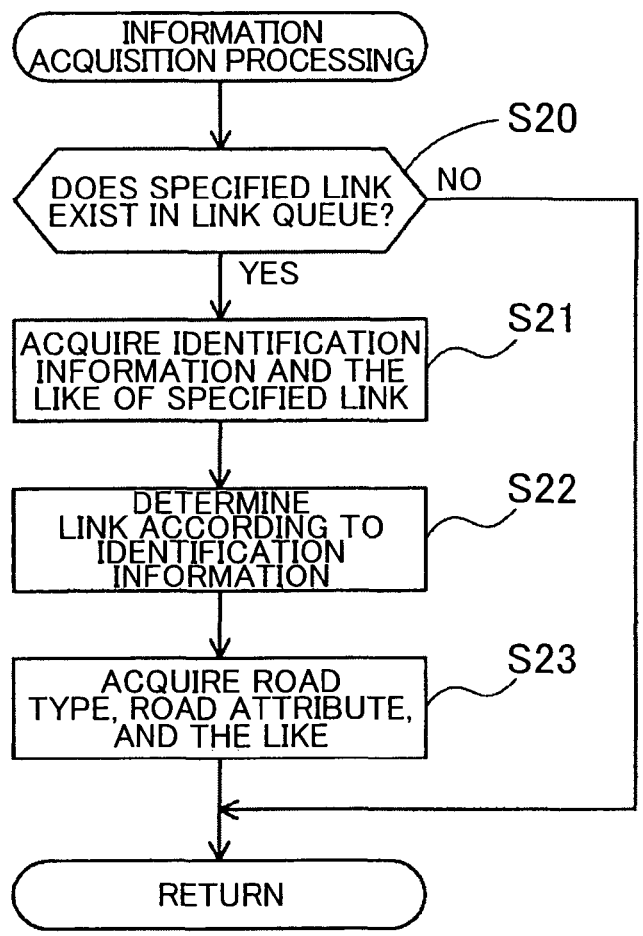
FIG. 8 is a flowchart showing a procedure example of the information acquisition processing in the navigation device according to the second embodiment of the present invention.

In FIG. 8, it is determined whether or not a specified link of which the road-related information is intended to be acquired exists in the link queue as Step S10 in FIG. 6 [Step S20]. If the specified link does not exist in the link queue (NO), the information acquisition processing is terminated and returned because the link to be acquired does not exist.

If the specified link exists in the link queue (Step S20: YES), the position information, the identification information, and the like are acquired for the specified link [Step S21], and the link to be referred is identified according to the identification information [Step S22]. For example, in the case of the link queue L10 indicated in FIG. 7; when the link L11 is specified, the link L11 itself is identified; when the link L13 is specified, the link L11 is identified; and when the link L17 is specified, the link L15 is identified. The identified link includes the road type and the road attribute. Therefore, the relevant road type and road attribute are acquired [Step S23]. Then, the information acquisition processing is terminated and returned. Thus, by executing Steps S21 and S23, the road-related information of the specified link can be acquired.

[Third Embodiment]

A third embodiment is an example that links and attribute information are separately provided in the link queue and explained with reference to FIGS. 9 and 10.

Figure 9:
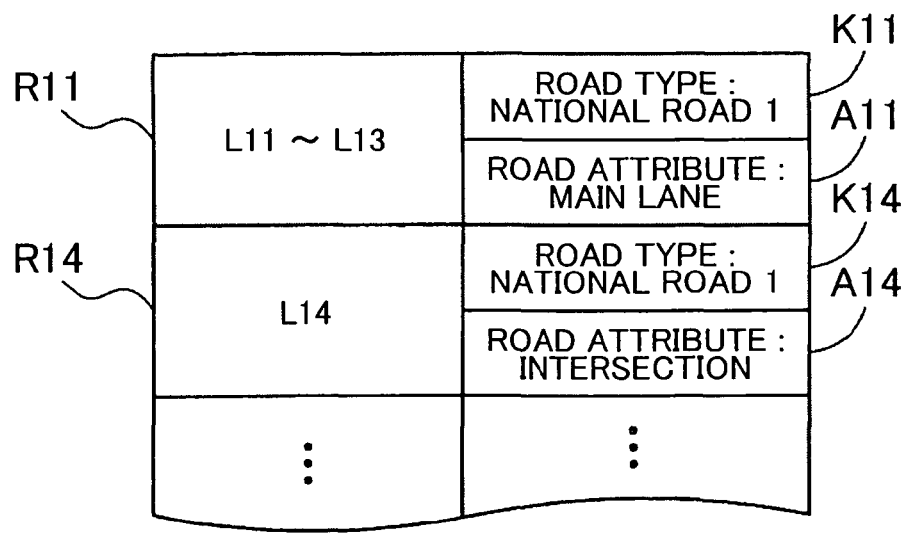
FIG. 9 is a schematic view showing a structure example of the link queue in the navigation device according to a third embodiment of the present invention.

FIG. 9 is a schematic view showing the structure example of the link queue in the navigation device according to the third embodiment of the present invention. FIG. 10 is a flowchart showing a procedure example of the information acquisition processing in the navigation device according to the third embodiment of the present invention.

The structure and the like of the navigation device is the same as the first embodiment. In order to make the illustration and explanation simple, portions different from the first embodiment is explained in the third embodiment. Thus, the same signs are assigned to the elements that are the same as the elements used in the first embodiment, and the explanation is omitted.

The link queue according to the present embodiment has a data structure providing a link attribute that indicates the range of the links of which neither the road type or the road attribute changes, independently of a plurality of links that are acquired by sectioning a consecutive and the same line. In other words, the first and the second embodiments have an integrated structure where the links, of which the road-related information (i.e., the road type, the road attribute, and the like) changes, include such road-related information. On the other hand, the third embodiment has a separate structure where the links and the road-related information (including the link attribute) are independently included in the link queue.

Next, the data structure shown in FIG. 9 is explained.

FIG. 9 shows an example of the link attribute based on the link queue L10 indicated in FIGS. 3 and 7. The links L11, L12, L13, L14, L15, L16, L17, L18, . . . constituting the link queue L10 are omitted. The link queue L10 in FIGS. 3 and 7 is sectioned into the range of the links L11 to L13, the range of only the link L14, the range of the links L15 to L17, and the range of only the link L18.

In each range, the road-related information (i.e., both the road type and the road attribute) is the same. Therefore, a link attribute R11 indicating the range of the links L11 to L13, a link attribute R14 indicating the range of only the link L14, and the like are independently provided in the link queue L10.

A method to identify the range of links is arbitrary. For example, a minimum value only, a maximum value only, the minimum value and the maximum value, and the like may be utilized. The links indicated by the range are not necessarily consecutive (for example, the links L1, L2, L3, and the like), but may be discrete (for example, the link L1, L5, L7, and the like) or mixed. The link attribute R11 includes the road type K11 and the road attribute A11, and the link attribute R14 includes the road type K14 and the road attribute A14. Including the road-related information (i.e., the road type and the road attribute) for each link attribute is to facilitate the acquisition of the road-related information relating to the links included in the link attribute.

Figure 10:
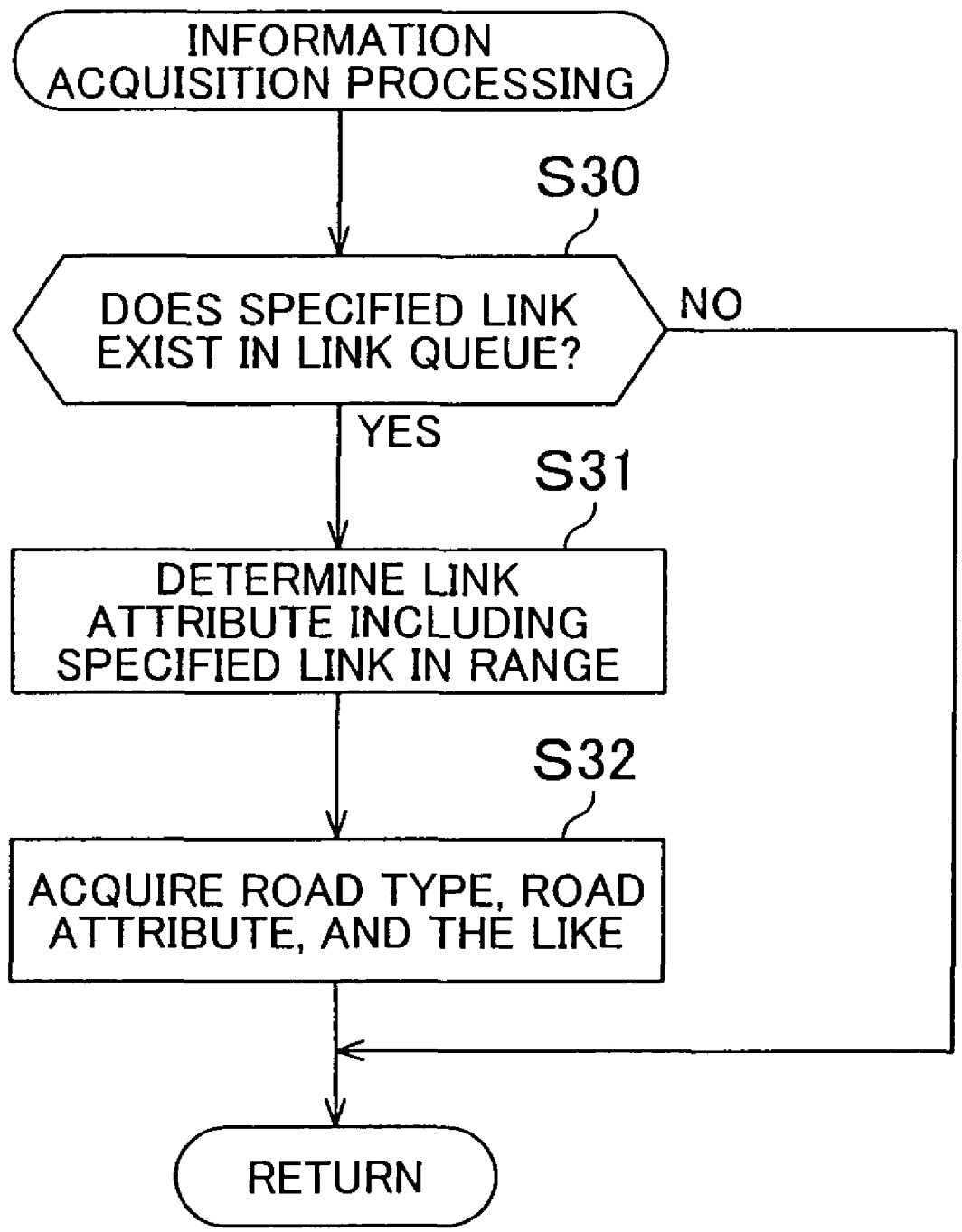
FIG. 10 is a flowchart showing a procedure example of the information acquisition processing in the navigation device according to the third embodiment of the present invention.

If the link queue in the data structure indicated in FIG. 9 is stored in the storage part 2 as the road data 12 (eventually, the search data 10), the road-related information can be acquired according to the information acquisition processing indicated in FIG. 10. That is, it is determined whether or not the specified link of which the road information is intended to be acquired exists in the link queue [Step S30]. If the specified link does not exist in the link queue (NO), the information acquisition processing is terminated and returned because the link to be acquired does not exist.

If the specified link exists in the link queue (Step S30: YES), the position information is acquired for the specified link and the link attribute including the specified link in the range is determined [Step S31]. In the case of the link attributes R11 and R14 indicated in FIG. 9, if the link L13 is specified, the link attribute R11 is determined. If the link L14 is specified, the link attribute R14 is determined. In other words, each time the road-related information (i.e., one or both of the road type and the road attribute) changes, one link attribute exists. The determined link attribute includes the road type and the road attribute. Therefore, the relevant road type and road attribute are acquired [Step S32]. Then, the information acquisition processing is terminated and returned. Thus, by executing Steps S31 and S32, the road information of the specified link can be acquired.

In the third embodiment, the road-related information is included for each link attribute (refer to FIG. 9). However, the road-related information may be associated with the link attribute. An association method is arbitrary. For example, the link attribute and the road-related information are associated with use of the identification information indicated in FIG. 7 according to the second embodiment. Also, in this data structure, by determining the link attribute based on the specified link, it is possible to surely acquire the road information including the road-related information.

[Fourth Embodiment]

A fourth embodiment is an example that the road data (especially, link queue data) to be stored in the storage part 2 is created, and explained with reference to FIG. 11.

Figure 11:
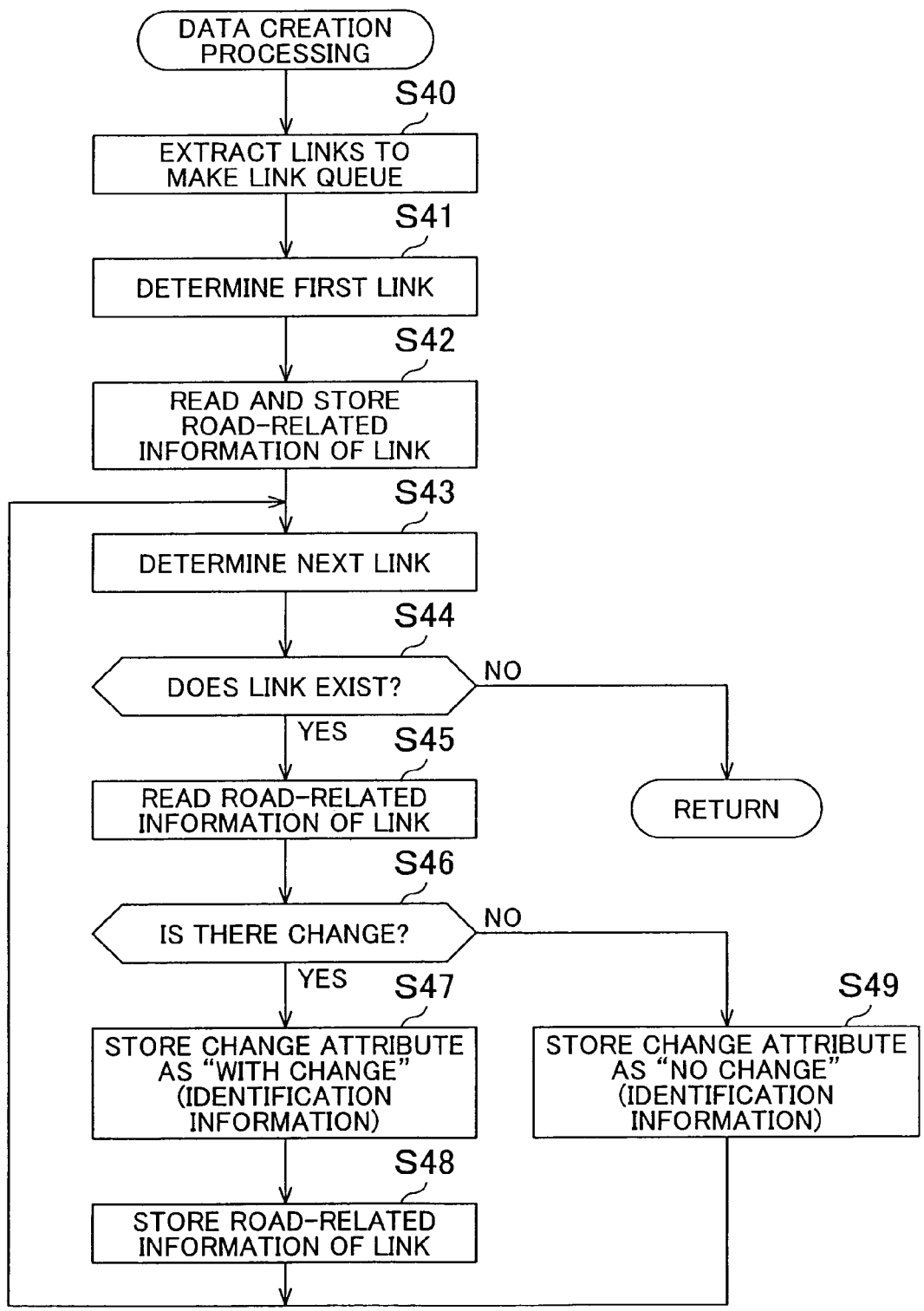
FIG. 11 is a flowchart showing a procedure example of data creation processing in the navigation device according to a fourth embodiment of the present invention.

FIG. 11 is a flowchart showing a procedure example of data creation processing in the navigation device according to the fourth embodiment of the present invention.

The structure and the like of the navigation device is the same as the first embodiment. In order to make the illustration and explanation simple, portions different from the first embodiment is explained in the fourth embodiment.

In the data creation processing indicated in FIG. 11, the link queue formation unit 3d, the change determination unit 3e, and the information storage unit 3f indicated in FIG. 1 are got into concrete form. First, the links for a target road (i.e., a consecutive and the same line) are extracted and the link queue is structured [the link queue formation unit 3d: Step S40]. The detailed explanation for structure method of the link queue is omitted.

At a step where Step S40 has been executed, in the case of the link queue L10 indicated in FIGS. 3 and 7, only the links L11, L12, L13, L14, L15, L16, L17, L18, ... have been extracted and there is no other information (the change attribute, the identification information, and the like).

For the link queue extracted at Step S40, a first link with respect to the travel direction is determined [Step S41]. As the first link necessarily includes the road-related information, the road-related information (for example, the road type, the road attribute, and the like) for such determined link is read from a predetermined device (for example, a storage medium and a computer on communication line) and stored [Step S42].

The link connected next to the currently-determined link with respect to the travel direction is determined [Step S43] and it is determined whether or not the determined link exists [Step S44]. If the link does not exist (NO), it means that the currently-determined link is the last link. Therefore, the data creation processing is terminated and returned.

If the determined link exists (Step S44: YES), the road-related information for the determined link is read from the predetermined device [Step S45] and it is determined whether or not the contents of the road-related information change compared to the previously-determined link [the change determination unit 3e: Step S46].

If the contents of the road-related information change (YES), the road-related information is stored for the currently-determined link [the information storage unit 3f: Steps S47 and S48], and Steps S42 to S49 are repeated. At Step S47, the change attribute indicating the information content as "with change" is stored according to the link queue L10 indicated in FIG. 3 and the identification information is stored according to the link queue L10 indicated in FIG. 7. At Step S48, the road-related information for the determined link read at Step S45 is stored.

On the other hand, if the contents of the road-related information do not change (Step S46: NO), for the currently-determined link, the change attribute indicating the information content as "no change" is stored according to the link queue L10 indicated in FIG. 3, or the identification information is stored according to the link queue L10 indicated in FIG. 7 [the information storage unit 3f: Step S49]. Then, Steps S42 to S49 are repeated.

By executing the above-mentioned processing, the road data 12 including the link queue L10 indicated in FIG. 3 or FIG. 7 can be stored as the search data 10 in the storage part 2.

[Effect of the Respective Embodiments]

According to the first embodiment and the second embodiment, the road data 12 including the link queues 21, 22, 23, ..., 2z having the plurality of links that are acquired by sectioning a consecutive and the same line under a predetermined condition and the road-related information having one or both of the road types K11, K14, K15, K18, ... and the road attributes A11, A14, A15, A18, ..., which changes compared to the adjacent link among the links 31, 32, 33, ..., 3x, 41, 42, ..., 4y included in such link queues is stored in the storage part 2 (refer to FIGS. 2 and 3). With this structure, it is not required that all the links constituting the link queue include the road-related information as is conventionally done. Therefore, it is possible not only to suppress enlargement of data size but also to reduce the data size. If the data can be stored in a low-capacity storage medium by the reduction of the data size, a cost can be also reduced.

In addition, according to the first embodiment and second embodiment, when performing the route search and the guidance from the departure point to the destination using the road data 12 stored in the storage part 2, if the specified link does not include the road-related information (refer to Step S12 in FIG. 6), the information acquisition unit 3c searches for a link including the road-related information from the link queues 21, 22, 23, ..., 2z and acquire the road-related information (refer to Steps S13 to S15 in FIG. 6). Thus, it is possible to surely acquire the road-related information of the specified link as is conventionally done; therefore, the route search can be performed as is conventionally done.

According to the first embodiment, the links L11, L12, L13, L14, L15, L16, L17, L18, ... constituting the link queue L10 are stored in the storage part 2 with, for example, the change attributes C11, C14, C15, C18, ... as "with change" if the road-related information changes, and with the change attributes C12, C13, C16, C17, ... as "no change" if the road-related information does not change (refer to FIG. 3). The information acquisition unit 3c can determine the link of which the road-related information changes by referring to the change attributes C11, C12, C13, C14, C15, C16, C17, C18 ... (refer to FIG. 3). Thus, it is possible to surely acquire the road-related information of such link, and the route search can be performed as is conventionally done. In addition, the information acquisition unit 3c can determine the link of which the road-related information changes by referring to the change attributes C11, C12, C13, C14, C15, C16, C17, C18 ... ; therefore, the processing speed is not decreased.

Further, according to the second embodiment, the link queue is structured with the standard links (L11, L14, L15, L18, ... ) having the road-related information and the invariance links (L12, L13, L16, L17, ... ) having the identification information for identifying such standard link, and stored in the storage part 2 (refer to FIG. 7). If the standard link has been specified, the information acquisition unit 3c acquires the road-related information. If the invariance link has been specified, the information acquisition unit 3c acquires the road-related information by referring to the standard link identified respectively according to the identification information P11, P12, P13, P14, P15, P16, P17, P18, ... (refer to FIG. 8). Thus, it is possible to acquire the road-related information quickly and easily whichever link in the link queue is specified.

In addition, according to the third embodiment, the road data 12 includes, for the link queue, the link attributes R11 and R14, which provides the range of the links of which both the road type and the road attribute are the same and do not change, and the road-related information structured with one or both of the road types K11, K14, ... and the road attributes A11, A14, ... for each of the link attributes (refer to FIG. 9). With this structure, the information acquisition unit 3c determines the link attribute having the specified link in the range (refer to Step S31 in FIG. 10) and acquires the road-related information included in the determined link attribute (refer to Step S32 in FIG. 10). Thus, the change attribute in the first embodiment and the identification information in the second embodiment are not necessary; therefore, the data size of the road data 12 (eventually, the search data 10) can be further decreased.

According to the fourth embodiment, two or more links over a consecutive and the same line are extracted as the link queue (refer to Step S40 in FIG. 11), it is determined whether or not the road-related information changes compared to the adjacent link for the links constituting the extracted link queue (refer to Step S46 in FIG. 11), and the road-related information is stored for the links according to whether or not the road-related information changes and recorded in the storage part 2 (refer to Steps S47, S48, S49 in FIG. 11). Thus, the road data 12 including the link queue (the link queue L10 indicated in FIGS. 3 and 7) can be automatically created and stored as the search data 10 in the storage part 2.

In addition, according to the fourth embodiment, each link includes the change attribute as "with change" if the road-related information changes, and includes the change attribute as "no change" if the road-related information does not change (refer to Steps S47 and S49 in FIG. 11). Thus, the road data 12 including the link queue (for example, the link queue L10 indicated in FIG. 3) can be automatically created and stored as the search data 10 in the storage part 2.

Further, according to the fourth embodiment, if the road-related information changes, the identification information indicating own link is stored, and if the road-related information does not change, the identification information indicating the link with change is stored (refer to Steps S47 and S49 in FIG. 11). Thus, the road data 12 including the link queue (for example, the link queue L10 indicated in FIG. 7) can be automatically created and stored as the search data 10 in the storage part 2.

[Other Embodiments]

While various features have been described in conjunction with the first embodiment through the fourth embodiment outlined above, various changes may be made without departing from the broad spirit and scope of the underlying principles. For example, the after-mentioned embodiments may be realized.

In the first embodiment through the third embodiment, the link queues 21, 22, 23, ..., 2z for the group of link queues 20 constituting the road data 12 are applied (refer to FIG. 2). Instead of this structure, a data structure in a link format that can be structured in the same manner as the link queue (for example, route display data 14 and the like) can be applied. Even in such data structure, the same effect as the first embodiment and the second embodiment can be obtained.

In the first embodiment, the data structure is such that the link of which the road-related information changes compared to the adjacent link includes the change attribute as "with change" and the link of which the road-related information does not change includes the change attribute as "no change" (refer to FIG. 3). Instead of this structure, the data structure may be such that the link of which the road-related information does not change does not include the road-related information and only include fundamental link information (for example, position information and the like). In case of this data structure, it is only necessary to determine whether or not the change attribute as "with change" exists at Steps S12 and S15 in the information acquisition processing of FIG. 6. Step S49 in the data creation processing of FIG. 11 becomes unnecessary. It is not necessary to store the change attribute as "no change"; therefore, the data size of the road data 12 (eventually, the search data 10) can be reduced.

Further, the data structure may be such that not only the link of which the road-related information does not change but also the link of which the road-related information changes do not include the change attribute. In the case of this data structure, it is only necessary to determine whether or not the road-related information is included at Steps S12 and S15 in the information acquisition processing of FIG. 6. Steps S47 and S49 in the data creation processing of FIG. 11 become unnecessary. Thus, the data size of the road data 12 (eventually, the search data 10) can be further reduced.

In addition, in the first embodiment and the second embodiment, the data structure is such that the road type and the road attribute are applied as the road-related information and the link of which one or both of the road type and the road attribute change includes such road type and road attribute. Instead of this structure (or in addition to this structure), the data structure that other road-related information than the road type and the road attribute is included in the link may be applied. Such other road-related information corresponds to, for example, the information of a road itself except the road type and the road attribute (position information of both ends, a road width, an inclination, a cant, an altitude, a bank, a road surface condition, an existence of a center divider, and the like) and the information having the road as a reference (geography, an architectural structure, information of a resort and a scenic spot, a parking facility along the road, and the like.) Even with the road data 12 in this data structure, it is not necessary that all the links include the road-related information. Therefore, it is possible to suppress the enlargement of the data size.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device comprising:
   a memory storing road data including at least one link queue, each link queue including a consecutive connection of a plurality of links acquired by sectioning a road length into its constituent links, each plurality of links including:
      at least one standard link for which road-related information is included in the stored road data; and
      at least one invariance link for which road-related information is not included in the stored road data, each invariance link being a link for which there is no difference in road-related information between the invariance link and an adjacent link in the link queue; and
   a controller that is configured to perform route search and guidance to a destination using the stored road data.

2. The navigation device according to claim 1, wherein the controller is configured to:
   perform the route search and provide the guidance for a specified standard link by acquiring the road-related information included in the stored road data for the specified standard link; and
   perform the route search and provide the guidance for a specified invariance link by searching for a closest standard link in the link queue to which the specified invariance link is included and acquiring the road-related information of the closest standard link.

3. The navigation device according to claim 2, wherein:
   the stored road data for each standard link includes a change attribute indicating that the road-related information changes compared to an adjacent link in a link queue to which the standard link belongs; and
   the stored road data for each invariance link includes a change attribute indicating that the road-related information does not change compared to an adjacent link in the link queue to which the invariance link belongs, and
   the controller is configured to determine whether the specified link is a standard link or an invariance link by referring to the change attribute in the stored road data for the specified link.

4. The navigation device according to claim 2, wherein:
   the stored road data for each invariance link includes identification information that identifies a standard link having road-related information included in the stored road data that is applicable to the invariance link; and the controller is configured to acquire the road-related information of the standard link identified by the identification information for the specified invariance link as the road-related information for the specified invariance link.

5. The navigation device according to claim 2, wherein:
the stored road data for each link queue includes a link attribute that identifies a range of the plurality of links comprising the link queue having the same road-related information and the road-related associated with the link attribute; and
the controller is configured to:
  determine the link attribute for a range of links including the specified link; and
  acquire the road-related information associated with the link attribute.

6. A navigation road data creating device configured to be used in a navigation device that performs route search and guidance to a destination using road data, the navigation road data creating device comprising:
a memory; and
a controller configured to:
  access road information, including a plurality of links and road-related information for the plurality of links;
  form a link queue by identifying a consecutive connection of consecutive ones of the links in the accessed road information, the consecutive links being identified by sectioning a road length in the road data into its constituent links;
  determine for each of the identified links forming the link queue whether road-related information for the link changes compared to an adjacent link in the link queue; and
  store each identified link in which road-related information for the link changes compared to an adjacent link in the memory as a standard link, the road-related information for the standard link being stored in the memory with the standard link; and
  store each identified link in which the road-related information for the link does not change compared to an adjacent link in a memory as an invariance link, the road-related information for the invariance link not being stored in the memory with the standard link.

7. The navigation road data creating device according to claim 6, wherein the memory:
stores for each standard link a change attribute indicating that the road-related information changes compared to an adjacent link in a link queue to which the standard link belongs; and
stores for each invariance link a change attribute indicating that the road-related information does not change compared to an adjacent link in the link queue to which the invariance link belongs.

\* \* \* \* \*